United States Patent [19]

Messick

[11] Patent Number: 4,909,476

[45] Date of Patent: Mar. 20, 1990

[54] ORIFICE ASSEMBLY FOR GAS METERING DEVICE

[75] Inventor: Walker A. Messick, Indianapolis, Ind.

[73] Assignee: Flotec, Inc., Indianapolis, Ind.

[21] Appl. No.: 218,196

[22] Filed: Jul. 13, 1988

Related U.S. Application Data

[63] Continuation-in-part of Ser. No. 60,943, Jun. 9, 1987, which is a continuation of Ser. No. 752,295, Jul. 5, 1985, abandoned.

[51] Int. Cl.$^4$ ............................................. F16K 51/00
[52] U.S. Cl. ..................................... 251/206; 251/205
[58] Field of Search .............. 251/205, 206, 207, 208, 251/209, 304

[56] References Cited

U.S. PATENT DOCUMENTS

| | | | |
|---|---|---|---|
| 3,949,966 | 4/1976 | Fabish | 251/206 |
| 4,148,460 | 4/1979 | Kinsler | 251/206 |
| 4,195,631 | 4/1980 | Baucom | 251/206 X |

Primary Examiner—John Fox
Attorney, Agent, or Firm—Millen, White & Zelano

[57] ABSTRACT

An improvement in the orifice assembly of a high pressure gas flow meter configures the orifice assembly with a plurality of brass disks arranged in a circular array with orifices of different diameters through the brass disks to provide a variety of gas flow rates through the orifice assembly. Each disk is held in position by an O-ring disposed between the disks and a retaining plate fixed to the rotor.

13 Claims, 3 Drawing Sheets

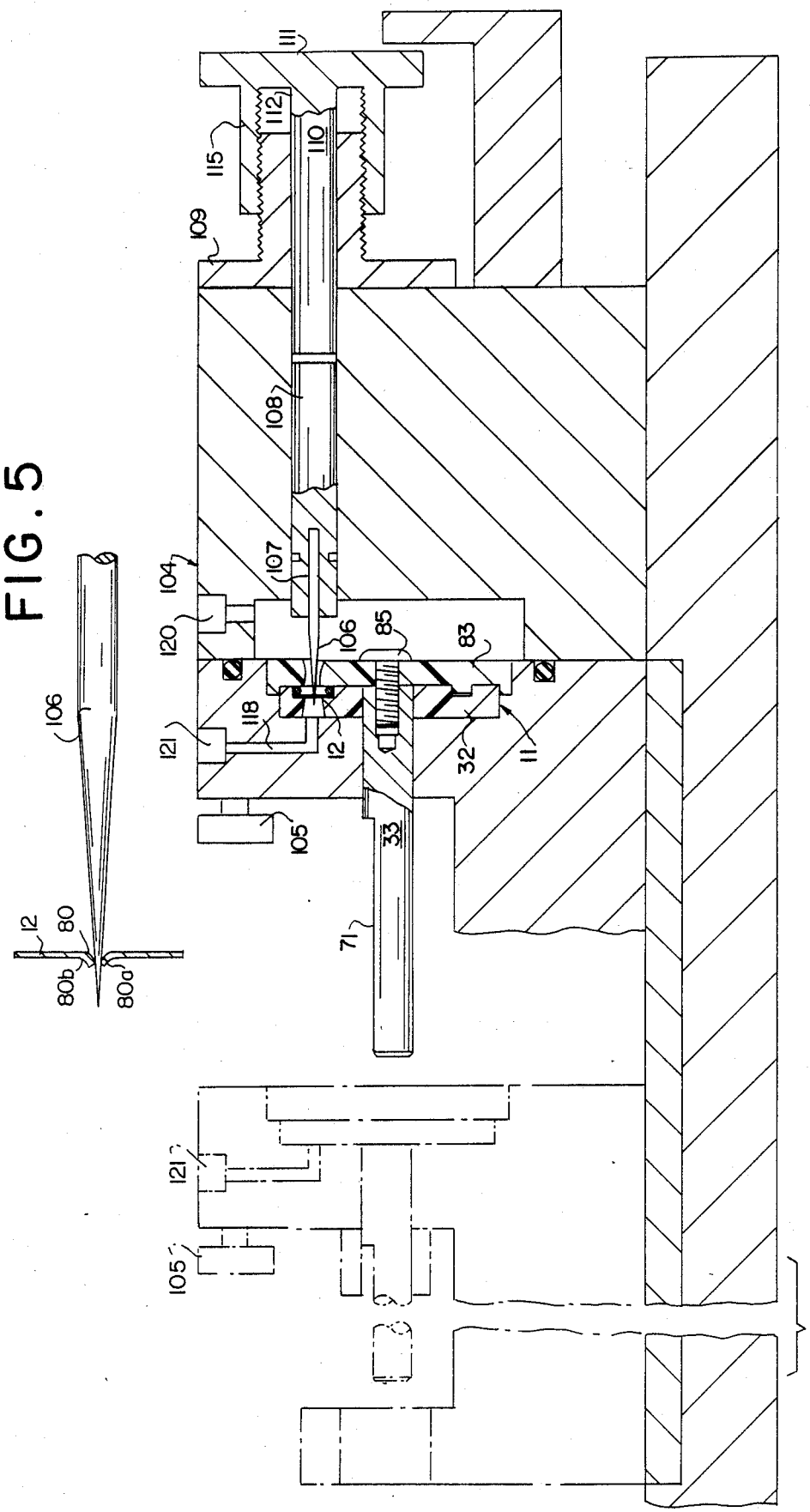

ORIFICE ASSEMBLY FOR GAS METERING DEVICE

RELATED APPLICATIONS

This application is a continuation-in-part of U.S. patent application Ser. No. 60,943 filed June 9, 1987 which is a continuation of U.S. patent application Ser. No. 752,295 filed July 5, 1985 and now abandoned.

BACKGROUND OF THE INVENTION

This invention relates generally to the field of gas flow-meter devices and more specifically to an orifice assembly for a gas-metering device.

The invention is especially applicable to precisely calibrated gas-metering orifices for metering a flow of gas, such as therapeutic oxygen, at a prescribed rate to a patient. The invention also relates to a flow meter which uses such metering orifices to selectively provide a plurality of accurate gas flow rates and to a pressure regulator unit having all of its component parts retained therein.

In the past, orifice punch devices have been used to make orifices of various sizes for flow meters. Generally with these punch devices, the operator punches an orifice in an element and then moves the element from the punch device to a separate flow testing device for measurement of the flow therethrough. If a greater rate of flow is required, the element is transferred back to the punch device for further punching. The transfer of the element back and forth, for further punching and testing is continued until the orifice is properly sized. Such a procedure is an inefficient use of the operator's time. In the alternative, the operator punches a series of elements forming a similar size first orifice in each. This process is then, in turn, repeated, forming a different size second orifice in each of the elements and so forth. While this procedure increased efficiency it also necessitated a great deal of uniformity in the elements prepared, thus the capability of custom designing an element for a specific need or use was severely restricted.

U.S. Pat. No. 4,241,896 to Voege describes forming a calibrated oxygen-metering aperture wherein a plug is progressively pressed into a hole in a valve body. The plug has in its surface a scored slot of progressively decreasing cross-sectional area which defines with the wall of the hole an aperture the size of which depends on the depth to which the plug is inserted in the hole. The gas flow rate through such an orifice is monitored as the plug is pressed into the hole and the plug is stopped at the position which gives the desired calibrated gas flow rate. Thus, the desired flow is attained by plugging the hole.

According to another approach, practiced by applicant and disclosed in patent applications Ser. Nos. 60,943 and 752,295 filed June 19, 1987 and July 5, 1985 respectively, a plurality of orifices are pierced and tapered in a single brass foil disk by a piercing element and the piercing of each orifice is continued until the desired rate of flow through that orifice is attained. This approach can stand improvement because if a mistake is made in piercing one orifice the entire disk may be ruined necessitating calibrating an entire new disk.

U.S. Pat. No. 4,572,477 discloses utilizing an array of relatively thick inserts with orifices therethrough, however, precise calibration of these inserts is exceedingly difficult.

SUMMARY OF THE INVENTION

In view of the aforementioned shortcomings of prior art approaches, it is an object of the instant invention to provide a new and improved gas metering assembly for a high pressure flow meter.

With this and other objects in mind, the instant invention contemplates an improvement in a high pressure flow meter, the flow meter including: a body having a gas inlet, a gas outlet, a regulator for regulating the gas pressure therebetween and a rotatable gas metering assembly, the improvement being in the rotatable gas metering assembly. The rotatable gas metering assembly comprises a cylindrical rotor element, rotatable about its axis, and having a front face and a rear face. A plurality of spaced bores, extending through the rotor element, are arranged in a circular array about the axis of the rotor element with the axes of the bores being parallel to the axis of the rotor element. A thin disk is positioned within each bore with each disk having an orifice of a different size extending therethrough. A retainer retains the disks in the bores. When a disk is indexed into alignment with a single passage aligned with the circular array of disks, gas is metered therethrough the disk in accordance with the size of the orifice in the disk.

BRIEF DESCRIPTION OF DRAWINGS

Various other objects, features and attendant advantages of the present invention will be more fully appreciated as the same becomes better understood when considered in connection with the accompanying drawings, in which like reference characters designate the same or similar parts throughout the several views, and wherein:

FIG. 4 is a fragmentary elevation of an orifice piercing fixture used to prepare orifices of various sizes for the metering assembly, and FIG. 5 is an enlarged side view of a brass disk and piercing needle after the disk has been pierced by a needle to form an orifice therethrough.

DESCRIPTION OF THE PREFERRED EMBODIMENT

Figure 1:
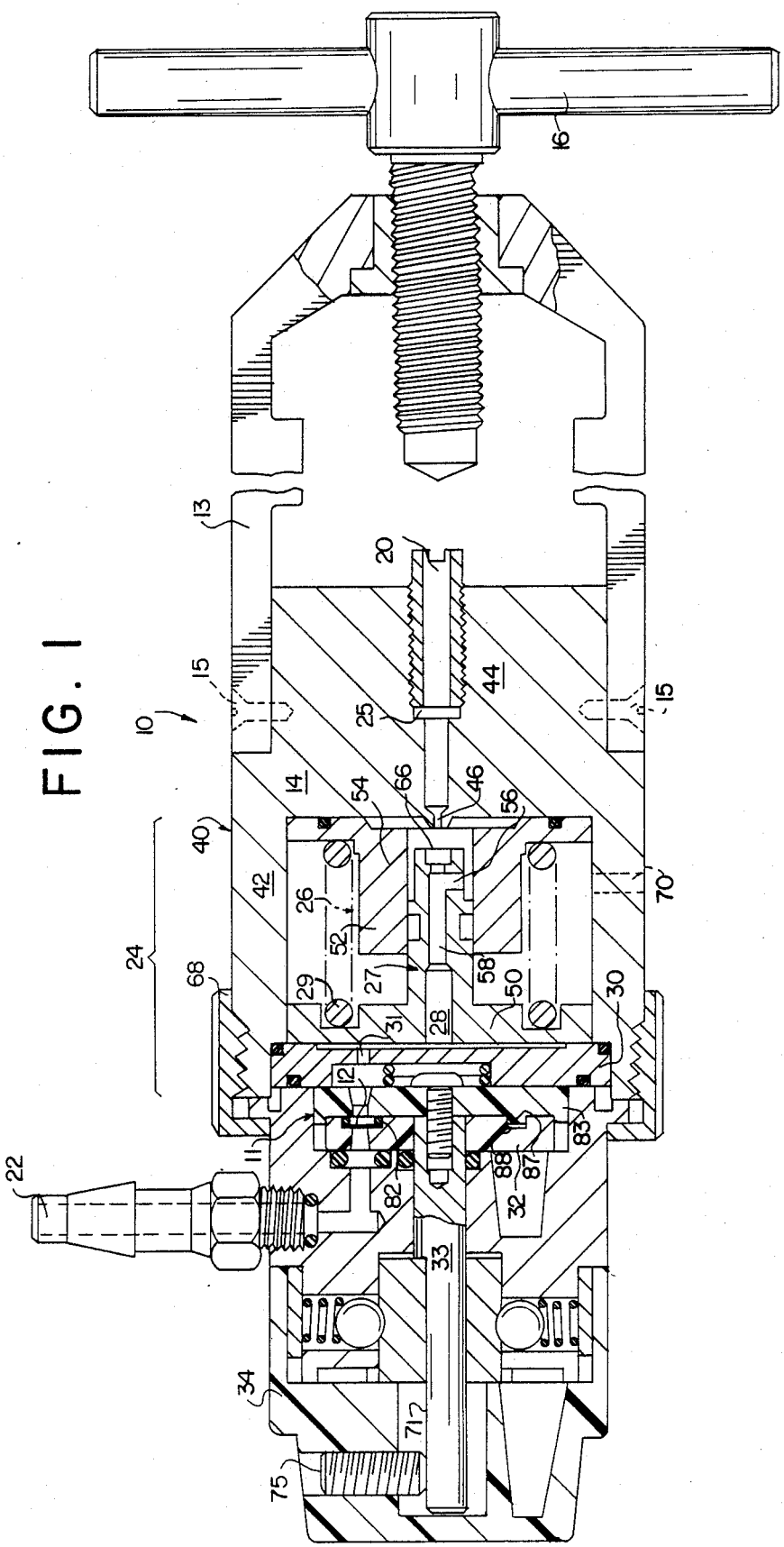
FIG. 1 is a side elevation of a flow meter with which the improved gas metering assembly is used.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modification in the illustrated device, and such further applications of the principles of the invention as illustrated herein being contemplated as would normally occur to one skilled in the art to which the invention relates.

Referring now to FIG. 1, there is illustrated a high pressure gas flow meter, designated generally by the numeral 10, operable on gas from a high-pressure source. The meter 10 includes an orifice assembly, designated by the numeral 11, with a plurality of calibrated brass disks 12 each having an orifice calibrated by the method of this invention. Flow meter 10 includes a yoke 13 secured to body 14 by a screw threaded studs 15. Yoke 13 has a T-handle 16 which permits the attachment and mounting of the flow meter unit to an outlet valve on the high pressure gas cylinder (not shown). In one recent embodiment, a CGA (Compressed Gas Association) 870 style yoke was used for securing the flow meter 10 to a cylinder of pressurized oxygen. It is understood, however, that the flow meter 10 of the present invention may be practiced with the flow meter having a different style yoke 13 or no yoke at all.

Body 14 includes a gas inlet 20 and a gas outlet 22 separated by a pressure regulating region 24 and the orifice assembly 11. The gas entering through inlet 20 passes through a standard replaceable filter disk 25 before entering pressure regulating region 24. The filter disk 25 serves to remove impurities present in the system, whether they enter the system from the pressure cylinder gas, the threading of the cylinder outlet valve, or elsewhere along the flow line. The filter disk 25 filters to a particle size of less than 100 microns without unduly restricting flow through the flow meter 10, i.e., while still permitting gas flow therethrough at the desired range of rates.

The high pressure flow meter 10 is designed to maintain an outlet flow pressure of 50 psig nominal for all flow ranges when provided with a gaseous supply in the range of 2200 to 500 psig. Region 24 includes a spring biased manifold assembly 26 and piston assembly 27 having an internal flow passage 28. A compressed coil spring 29 and the relationship between the manifold assembly 26 and the piston assembly 27 reduce the pressure of the gas from the high pressure at the source 20 to a nominal pressure of 50 psi at the interface plate 30. The pressure actually realized will vary depending upon the pressure of the gas in the feed cylinder. The gas then passes through an aperture 31 in the interface plate 30 at which point it next comes in contact with the orifice assembly 11.

The orifice assembly 11 includes the array of gasmetering disks 12 each having orifice calibrated by the method of this invention mounted on rotor 32 configured in accordance with the principles of the invention. The disks 12 are adapted to be selectively positioned or indexed by rotating the rotor 32 to provide orifices allowing different gas flow rates. The rotor 32 is rotatable by means of shaft 33 projecting axially out of body 14. A knob 34 is fixed to shaft 33, the knob includes appropriate markings to indicate the angular position of rotor 33 and thus of the disks 12. The markings may be raised Braille type facilitating use of the flow meter by blind people. To further assure proper flow setting, knob 34 may be provided with a standard positive self-centering, audible detent.

In one recent embodiment, a flow meter was constructed wherein eleven disks were pierced and calibrated and one disk left unpierced so as to allow the use of the flow meter 10 to select flow rates therethrough of 0, 0.5, 1.0, 1.5, 2.0, 2.5, 3.0, 4.0, 5.0, 6.0, 7.0, or 8.0 liter/min. While standard sized orifices may be provided, the present invention may be custom designed, having orifices calibrated to flow rates specified by the user.

Regulator unit 40 which preferably employed with the meter incorporating the orifice assembly of the present invention is incorporated in the regulating region 24. Regulator unit 40 includes a regulator body 42 which is threadably engaged with the flow meter body 44. Flow meter body 44 has an orifice 46 through which the operational gas passes into regulator unit 40. The gas entering the regulator 40 first comes in contact with the head 48 of a piston 50, which in turn passes through the internal sleeve 52 of high-pressure manifold 54. The high pressure manifold 54 is held captive between the flow meter body 44 and the regulator body 42. Piston 50 has a side port 56 through which the operational gas passes to the internal passage 58 of piston 50. The operational gas then communicates with the interface plate 30 of regulator body 52 which has gas outlet aperture 31 through which the gas exits the regulator unit and enters the orifice assembly 11 as shown in FIG. 1.

The travel of piston 50 relative to regulator body 42 and captive pressure manifold 54 is regulated by a coil spring 64 and the pressure of the operational gas passing through the internal piston passage 58.

The head 48 of piston 50 includes a flexible seal 66. When gas flowing out of the regulator unit 40 is shut off, pressure builds within the unit causing the piston head 48 to travel within the manifold sleeve 52. The pressure continues to build until the internal pressure if sufficient to cause the seal 66 to abut against orifice 46 of flow meter body 44, thus shutting off flow into the regulator unit 40. The seal 66 is preferably made of a polymer material. A molybdenum disulfide filled nylon material has been found to be most preferred.

Regulator body 42 has a standard ring nut 68 threaded to it, permitting the mounting of the regulator unit 40 to a flow metering assembly such as the previously described orifice assembly 10.

Regulator body 42 is also provided with a safety vent port 70, which provides an atmospheric pressure release should the gas, for any reason, inadvertently leak into the region encased by regular body 42, piston 50, and manifold 54. Vent port 70 prevents inadvertent pressure build up within the regulator unit.

Figure 2:
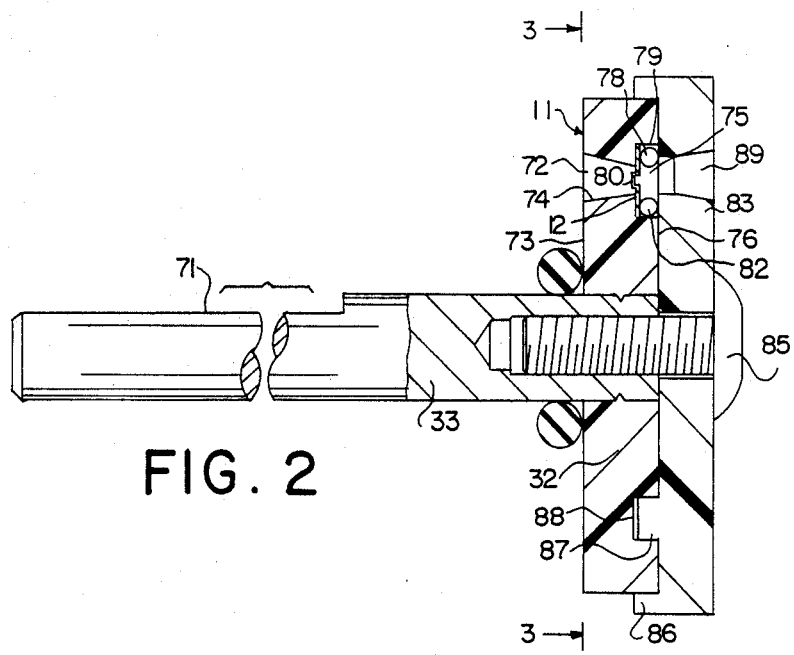
FIG. 2 is a side elevation of a metering assembly embodying the improvement of the instant invention.

Referring now to FIG. 2 where the orifice assembly 11 is shown in cross section, it is seen that the orifice assembly include the rotor element 32, which has the shaft 33 thereon, which shaft 33 has a flat 71 engaged by a set screw 75 (see FIG. 1) to rigidly secure the rotor element 32 to the operating knob 34. The rotor element 32 has a plurality of frustoconical bores 72 extending through a first face 73 thereof, each of which has a converging wall 74 that converges until it intersects a recess 75 through a second face 76 of the rotor element 32. In that each of the recesses 75 is coaxial with one of the bores 72 and have diameters greater that of the bores at the area of intersection, lands 78 are formed at the bottoms of the recesses 75 and are spaced from the second face 76 by shoulders 79. The lands 78 support the brass disks 12, each of which has a diameter slightly less than that of the recess 75 in which they are mounted. Each of the brass disks 12 has an orifice 80 therethrough of a selected diameter so as to allow a predetermined volume of gas to flow therethrough.

Each disk 12 is retained in place by an 0-ring 82 having thickness slightly greater than the distance between the back surface of the brass disk 12 and the second face 76 of the rotor element 32. A circular retaining plate 83, having a diameter slightly greater than that of the rotor 32, is secured to the rotor by a screw 85. The retaining plate 83 has a lip 86 thereabout which overlaps the periphery of the rotor 32 and a projection 87 which is received in a complementary bore 88 in the rotor to prevent the retaining plate from rotating with respect to the rotor. The retaining plate 83 bears against the 0-rings 82 and compresses the 0-rings so as to seal the brass disks 12 against the shoulders 78. A plurality of frustoconical bores 89 each having a diameter less than the associated recess 75 and having an end opening 90 of a diameter approximating that of the smaller end of the associated conical opening 72 so as to allow gas on the upstream side of the orifice assembly 11 to communicate with whichever of the brass disks 12 is rotated into alignment with bore 31 and interface plate 30 (see FIG. 1).

Figure 3:
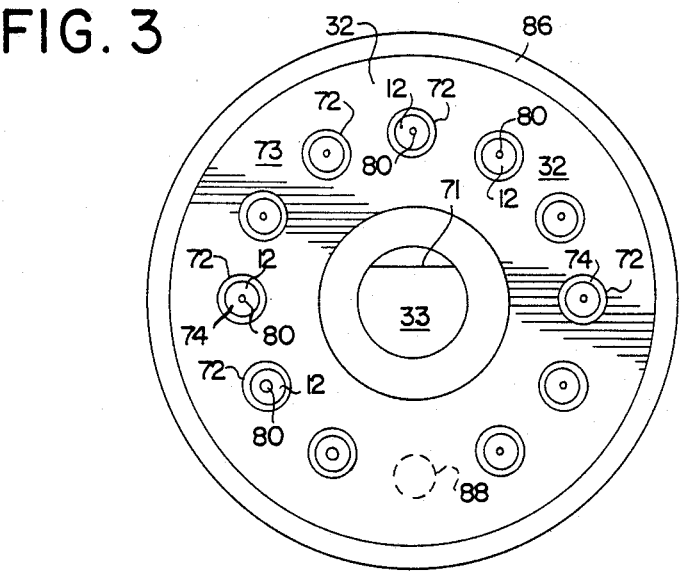
FIG. 3 is a front view of the metering assembly of FIG. 3 taken on lines 3—3 of FIG. 2.

Referring now to FIG. 3 where a preferred embodiment of the orifice assembly 11 is shown, an array of eleven bores 72 through the first face 73 of the rotor 32 are utilized. Exemplary of brass disks 12 used to practice the invention are brass disks about 0.002 of an inch thick and having a diameter of approximately 9/64 of an inch. Each of the 0-rings 82 has an outside diameter of approximately 9/64 of an inch; an inside diameter of approximately 8/64 of an inch, and an axial thickness of approximately 1/32 of an inch which is about 0.008 to 0.010 greater than the height of the shoulders 79. Since the thickness of the brass disks 12 and thickness of the 0-rings 82 is 0.008 to 0.010 greater than the heights of the shoulders 79, the 0-rings are squeezed into tight engagement with the brass disks preventing leakage around the disks.

Referring now to FIG. 4, an orifice piercing fixture, designated generally by the numeral 104, useful in the calibration of orifices of a gas-metering disk is shown. The orifice assembly 11 as shown in FIGS. 1, 2 and 3 is secured in the fixture 104, by use of some type of securing means such as a standard locking pin 105. A piercing element 106 is fixed in the distal end portion 107 of plunger shaft 108. The piercing element 106 is preferably a hardened, ground, very sharp steel needle having a ten degree included angled taper from its shank to its point.

As is seen in FIG. 5, the needle 106 pierces the disk 12 to form an orifice 80 which is defined by a venturi shaped wall 80a with a convex radius 80b (as viewed from within the orifice) joining the orifice wall to the disk. By using a sharp steel needle 106 with a ten degree taper; utilizing quarter hard brass disks 12 which has a thickness of 0.002 of an inch and securing the disks with compressed 0-rings 82; venturi type orifices 80 are made in the disks which are smooth with no broken or jagged edges which might disturb the smooth gas flow and create turbulence.

The piercing fixture 104 has a collar 109, through which plunger 110 passes. In the at rest position of plunger 110, knob 111, located at proximal end 112 is threadingly engaged about collar 109 and limits the extent of advancement of piercing element 106 through one of the disks 12. The knob 111 can be pressed toward the orifice assembly 11 and away from the stop block 113 only so far as the stop ring 115. This results in the piercing element 106 not being able to extent as far toward and into orifice assembly 11. The greater the advancement of the piercing element 106, the larger the outer circumference of the piercing element at the point of contact with the brass disk 12. For example, when shifting from calibrating an orifice for a gas flow rate of 1.0 liter/min to calibrating an orifice for a flow or 5.0 liters/mins., the operator will rotate the stop ring in the clockwise direction permitting the piercing element to further extend into the orifice assembly. Thus, advancement of piercing element 106 through a retainer passageway 117, disk 12 and an aperture 118 results in the piercing and tapering of an orifice in the disk 12.

Fixture 24 is provided with gas inlet 120 and gas outlet 121. Gas outlet 121 is connected to a conventional gas flow gauge (not shown), permitting the operator to measure the gas flow rate through the disk orifice while the foil disk is still in the orifice piercing fixture 104. This allows the piercing of the orifice 80 in the disk 12 to be continued uninterrupted until the desired flow rate through the orifice is attained, without needing to move the orifice assembly 11 to a separate flow testing device and then back to the piercing fixture for further piercing.

It is noted that an orifice assembly 11 having a plurality of disks 12 with orifices 80 therein may have each orifice pierced sequentially or simultaneously by incorporating plural piercing elements in the orifice piercing fixture.

Another approach to the invention is to simply have a supply of disks 12 on hand which are precalibrated with various holes 80. In assembling the rotor element 32, one selects brass disks 12 with various sized openings in order to provide the variety of flow rates desired for the flow meter 10.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An improvement in a high pressure flow meter, the flow meter including a body having a gas inlet, a gas outlet, means for regulating the gas pressure therebetween and means for metering the gas flow therebetween, said metering means including a rotatable gas metering assembly, the improvement being in the rotatable gas metering assembly and comprising:

a cylindrical rotor element rotatable about its axis, the rotor element having a front face and a rear face;

a plurality of spaced bores extending through the rotor element and being arranged in a circular array bout the axis of the rotor element with the axes of the bores being parallel to the axis of the rotor element;

the bores each have a circular wall extending from the front face to a position adjacent to the rear face, wherein each of the circular walls intersects a recess having a diameter greater than the bore to form a shoulder in the recess;

a disk positioned within each bore and resting on the shoulder in the bore, each disk having an orifice of a different size extending therethrough, and means for retaining the disks in the bores, the retaining means comprising a plurality of 0-rings, one in each recess, the 0-rings having an outside diameter no greater than the diameter of the recess; and retaining plate abutting the front face of the rotor element, the plate having an array of bores therethrough corresponding in position to the array of bores through the rotor element, each bore having a diameter less than the diameter of the 0-rings; means for urging the retaining plate against the 0-rings so that when the bores in the retaining plate are aligned with the bores on the rotor element, the 0-rings are urged against the disks and the disks are retained in place, whereby when the disks are indexed into alignment with the single passage aligned with the circular array of disks, gas is metered through the disks in accordance with the size of the orifice.

2. The improvement of claim 1 wherein each disk is made of brass.

3. The improvement of claim 2 wherein each disk is approximately 0.002 of an inch thick and approximately 9/64 of an inch in diameter.

4. The improvement of claim 3 wherein there are eleven disks in the array.

5. The improvement of claim 3 further including projection means extending between the retaining plate and rotor element for rotationally locking the retaining plate and rotor element with respect to one another.

6. The improvement of claim 3 wherein the orifice in each disk is defined by a frustoconical shaped wall.

7. An improvement in a high pressure flow meter, the flow meter including a body having a gas inlet, a gas outlet, means for regulating the gas pressure therebetween and means for metering the gas flow therebetween, said metering means including a rotatable gas metering assembly, the improvement being in the rotatable gas metering assembly and comprising:

a cylindrical rotor element rotatable about its axis, the rotor element having a front face and a rear face;

a plurality of spaced bores extending through the rotor element and being arranged in a circular array about the axis of the rotor element with the axes of the bores being parallel to the axis of the rotor element, wherein the bores each have a circular wall extending from the front face to a position adjacent to the rear face, wherein each of the circular walls intersects a recess having a diameter greater than the bore to form a shoulder in the recess which shoulder supports one of the disks;

the bores being frustoconical in shape and converging from an opening in the front face of the rotor element as the bores approach the respective recesses;

a disk positioned within each bore and resting on the shoulder in the bore, each disk having an orifice of a different size extending therethrough, and means for retaining the disks in the bores, whereby when the disks are indexed into alignment with a single passage aligned with the circular array of disks, gas is metered through the disks in accordance with the size of the orifice.

8. The improvement of claim 7 wherein the retaining plate has a diameter greater than the rotor element and a peripheral lip which overlies the periphery of the rotor element.

9. The improvement of claim 7, wherein each disk is made of brass.

10. The improvement of claim 9, wherein each disk is approximately 0.002 of an inch thick and approximately 9/64 of an inch in diameter.

11. The improvement of claim 10, wherein there are eleven disks in the array.

12. The improvement of claim 10 further including projecting means extending between the retaining plate and rotor element for rotationally locking the retaining plate and rotor element with respect to one another.

13. The improvement of claim 10, wherein the orifice in each disks is defined by a frustoconical shaped wall.

* * * * *